Oct. 12, 1965　　　H. C. O'BRIEN, JR　　　3,211,598
METHODS OF COATING PIPE
Filed Sept. 11, 1961
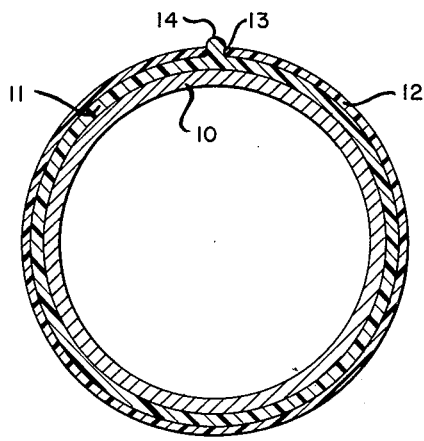
INVENTOR
Harold C. O'Brien, Jr.
his attorneys

# United States Patent Office 3,211,598
Patented Oct. 12, 1965

3,211,598
METHODS OF COATING PIPE
Harold C. O'Brien, Jr., c/o Royston Laboratories, Inc.,
Pittsburgh 38, Pa.
Filed Sept. 11, 1961, Ser. No. 137,341
3 Claims. (Cl. 156—85)

This invention relates to pipe coatings and particularly to a protective coating and process of coating pipes which acts to continually and immediately seal any openings or breaks in itself so as to always provide a continuous protective layer on the pipe surface. This invention is a continuation-in-part of my copending application Serial No. 663,938, filed June 6, 1957, now Patent 3,012,585, issued December 12, 1961.

It has long been the practice to form protective coatings over steel pipe and tubing, particularly that which is to be buried, in order to minimize corrosion. One of the common methods of coating pipe is to apply a layer of waxy material over the pipe and then to coat this waxy layer with cellulose acetate butyrate. There is no bond between the waxy undercoat and the outer butyrate coat. A single pinhole in the butyrate coat jeopardizes the entire length of pipe, which is then only protected by the waxy coating on the pipe. Another practice is to coat the pipe with a bituminous emulsion which may or may not thereafter be coated with an outer layer of paper, cloth or other covering material. Here again a pinhole or cut jeopardizes the pipe line by exposing at least the area of the injury to whatever corrosive environment may be present.

I have invented a coating and a method of applying coating to pipe which eliminates these difficulties of prior known coatings. The coating of my invention will automatically and immediately seal any pinhole or other injury in the coating so as to continuously form a protective coating on the pipe to which it is applied.

I provide a method which preferably comprises applying a coating of elastic resinous primer capable of flowing at ordinary temperatures directly on the pipe, and an outer protective coating of water impervious hardenable plastic material under tension over the elastic resinous primer so as to apply pressure on the inner resinous primer whereby the inner coating is pressurized. Preferably the outer coating is a hard, abrasion resistant electrically insulative plastic, e.g., vinyl, polyethylene, natural synthetic rubber and compounds thereof, phenolic, epoxy, styrene, cellulose acetate, etc. Preferably I use cellulose acetate butyrate for the outer coating. Preferably the coating is hot extruded over the inner coating. However, it may be cold extruded or wound onto the inner coating. The inner coating is preferably a soft, rubbery elastic resinous material flowable under pressure and capable of retaining its elasticity and flowing properties under extremes of temperature, as for example cumar-indene resin, neoprene, styrene, hydrocarbon resin compounds and plasticizers of lower molecular weight. The inner coating should be selected to be compatible with and bondable with the outer protective hardenable plastic layer. Pressure exists on this inner layer by reason of the tension of winding or shrinkage after extrusion of the outer coat. Pressure is additionally applied by the pressure of the earth on burial. Preferably the inner coating is one which will harden on exposure at holes in the outer covering.

When a fault appears in the outer protective layer of the coating of my invention, or even in both layers, the inner elastic layer flows into the fault, sealing it against the ingress of corrosive liquids. Measurements on pipe coated with the coating and method of this invention in salt solution, acids and alkali solutions have demonstrated remarkably decreased values of electrical leakage at pinholes on continuous exposure in electrolyte.

Pieces of one inch pipe were coated with a conventional wax primer and an outer cellulose acetate butyrate coating in the conventional manner. A like number of pieces of one inch pipe were coated with an inner coating of cumar-indene resin and an outer cellulose acetate butyrate coating according to the invention.

Pieces of each type of coated pipe were subjected to General Radio bridge resistance measurements and the results are tabulated in Table I.

TABLE I

|  | Megohms |
|---|---|
| Conventional coating | 110,000 |
| Coating of the invention | 170,000 |

Pieces of each type of coated pipe were subjected to immersion in various electrolytes after nine holes 1/16″ in diameter were placed in each coating. The results of these immersion tests are tabulated hereinbelow:

TABLE II

Immersion in 50% sodium chloride solution

|  | Ohms |
|---|---|
| Conventional coating | 150 |
| Coating of the invention | 1500 |

TABLE III

Immersion in 5% sodium chloride solution

|  | Initial 2/4/55 (ohms) | Final 2/17/56 (ohms) |
|---|---|---|
| Conventional coating | 80 | 100 |
| Coating of the invention | 300 | 23,000,000 |

TABLE IV

Immersion in 5% hydrochloric acid solution

|  | Initial 2/4/55 (ohms) | Final 2/17/56 (ohms) |
|---|---|---|
| Conventional coating | 20 | 60 |
| Coating of the invention | 100 | 2,000 |

TABLE V

Immersion tests in 20% sodium hydroxide solution

|  | Initial 2/4/55 (ohms) | Final 2/17/56 (ohms) |
|---|---|---|
| Conventional coating | 1,500 | 10,000,000 |
| Coating of the invention | 20,000 | 18,000,000 |

The sample of conventional coating material ruptured completely in 5% salt due to the pressure of rust beneath the coating whereas in the case of coating of this invention the extrusion of inner coating sealed the pinholes and increased the electrical resistance to 23,000,000 ohms. This is of extreme importance in considering cathodic protective current requirements for underground exposures.

The coating of this invention is illustrated in the sectional figure which accompanies this application.

In the drawing there is illustrated a pipe 10 having a coating 11 of neoprene applied directly to the outer surface thereof. An outer coating of cellulose acetate butyrate 12 is extruded over the neoprene coating so as to place the neoprene coating 11 under pressure. An opening 13 in the outer coating 12 is shown with an extruded sealing portion 14 from the inner layer 11 filling and sealing the opening 13.

In a preferred practice a coating of plasticized reclaimed rubber is extruded onto the pipe and an outer shell of polyethylene is extruded over the rubber. The cooling polyethylene shrinks and places the plasticized rubber inner layer under compression.

Another satisfactory practice is to apply the inner coating 11 and to wrap a hot ribbon of polyethylene or the like about the inner coating so that as the outer layer shrinks upon cooling it places the inner layer in compression.

While I have illustrated and described certain preferred embodiments and practices of this invention it will be understood that the invention may be otherwise embodied within the scope of the following claims.

I claim:

1. A method of coating pipe comprising the steps of applying as an inner layer over the surface of said pipe a soft rubbery elastic resinous material flowable under pressure and capable of retaining its elasticity and flow properties under extremes of temperature, applying as an outer layer a water impervious continuous layer of hardenable electrical insulative plastic over the soft resinous inner layer and shrinking and hardening said outer layer to place the inner layer under continuous radial compression.

2. A method of coating pipe comprising the steps of extruding as an inner layer over the surface of said pipe a coating of soft rubbery elastic resinous material flowable under pressure and capable of retaining its elasticity and flow properties under extremes of temperature, extruding a hot outer coating of a water impervious hardenable electrical insulative plastic over said elastic inner layer and cooling and shrinking said outer coating to place the inner layer under continuous radial compression.

3. A method of coating pipe comprising the steps of applying over the surface of said pipe a soft rubbery coating selected from the group of elastic resinous materials consisting of cumar-indene resin, neoprene, styrene, hydrocarbon resins and plasticizers of lower molecular weight, all compounded to remain flowable under pressure at the temperatures to be encountered by the pipe in use, applying an outer hard continuous layer of an electrical insulative material selected from the group consisting of vinyl resins, polyethylene, natural and synthetic rubber compounds, phenolic resins, epoxy resins, styrene, cellulose acetate and cellulose acetate butyrate onto the soft rubbery coating and hardening and shrinking said outer layer so as to place and hold the soft rubbery coating under radial compression.

References Cited by the Examiner

UNITED STATES PATENTS

| | | | |
|---|---|---|---|
| 1,948,007 | 2/34 | Putnam | 156—188 XR |
| 2,161,036 | 6/39 | Gremmel et al. | 156—187 |
| 2,918,940 | 12/59 | Carr | 156—187 |
| 2,930,710 | 3/60 | Koenicke et al. | 117—75 XR |
| 2,951,769 | 9/60 | McKnight | 117—75 XR |
| 3,047,448 | 7/62 | Feller et al. | 156—244 XR |

EARL M. BERGERT, *Primary Examiner.*